United States Patent
Jahnke

(10) Patent No.: US 11,508,981 B2
(45) Date of Patent: Nov. 22, 2022

(54) METHANATION OF ANODE EXHAUST GAS TO ENHANCE CARBON DIOXIDE CAPTURE

(71) Applicant: FuelCell Energy, Inc., Danbury, CT (US)

(72) Inventor: Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 818 days.

(21) Appl. No.: 16/097,165

(22) PCT Filed: Apr. 12, 2017

(86) PCT No.: PCT/US2017/027261
§ 371 (c)(1),
(2) Date: Oct. 26, 2018

(87) PCT Pub. No.: WO2017/189238
PCT Pub. Date: Nov. 2, 2017

(65) Prior Publication Data
US 2021/0218044 A1 Jul. 15, 2021

Related U.S. Application Data

(60) Provisional application No. 62/329,663, filed on Apr. 29, 2016.

(51) Int. Cl.
*H01M 8/0668* (2016.01)
*B01D 53/32* (2006.01)
(Continued)

(52) U.S. Cl.
CPC ........ *H01M 8/0668* (2013.01); *B01D 53/326* (2013.01); *F01K 23/10* (2013.01);
(Continued)

(58) Field of Classification Search
CPC .......... H01M 8/0668; H01M 8/04082; H01M 8/04089; H01M 8/04097; H01M 8/0438;
(Continued)

(56) References Cited

U.S. PATENT DOCUMENTS 4,449,994 A    5/1984   Hegarty et al.
4,476,633 A   10/1984   Shah et al.
(Continued)

FOREIGN PATENT DOCUMENTS

CA    2956439       4/2017
CN    101809396 A   8/2010
(Continued)

OTHER PUBLICATIONS

First Office Action in JP 2018-556825 dated Feb. 25, 2020, with English translation (14 pages).
(Continued)

*Primary Examiner* — Mayla Gonzalez Ramos
(74) *Attorney, Agent, or Firm* — Foley & Lardner LLP

(57) ABSTRACT

A power production system includes a flue gas generator configured to generate a flue gas that includes carbon dioxide and oxygen; a fuel supply; a fuel cell assembly that includes: a cathode section configured to receive the flue gas generated by the flue gas generator, and output cathode exhaust, and an anode section configured to receive fuel from the fuel supply, and output anode exhaust that contains hydrogen and carbon dioxide; a methanator configured to receive the anode exhaust, convert at least a portion of the hydrogen in the anode exhaust to methane, and output methanated anode exhaust; a chiller assembly configured to cool the methanated anode exhaust to a predetermined temperature so as to liquefy carbon dioxide in the methanated anode exhaust; and a gas separation assembly con-
(Continued)

figured to receive the cooled methanated anode exhaust and separate the liquefied carbon dioxide from residual fuel gas.

14 Claims, 6 Drawing Sheets

(51) Int. Cl.
*F01K 23/10* (2006.01)
*F02C 1/06* (2006.01)
*F02C 6/18* (2006.01)

(52) U.S. Cl.
CPC ............ *F02C 1/06* (2013.01); *B01D 2256/22* (2013.01); *B01D 2257/80* (2013.01); *F02C 6/18* (2013.01)

(58) Field of Classification Search
CPC ......... H01M 8/04425; H01M 8/04746; H01M 8/04201; H01M 8/04225; H01M 8/04753; H01M 2008/1293; H01M 2550/20; B01D 53/326; B01D 2256/22; B01D 2257/80; F01K 23/10; F02C 1/06; F02C 6/18; Y02E 60/50; Y02T 90/40; B60L 58/31; B60L 58/34; B60L 50/72
See application file for complete search history.

(56) References Cited

U.S. PATENT DOCUMENTS

| | | | |
|---|---|---|---|
| 4,476,683 A | 10/1984 | Shah et al. | |
| 4,532,192 A | 7/1985 | Baker et al. | |
| 4,828,940 A * | 5/1989 | Cohen | H01M 8/0612 |
| | | | 429/456 |
| 5,518,828 A | 5/1996 | Senetar | |
| 6,063,515 A | 5/2000 | Epp et al. | |
| 6,162,556 A | 12/2000 | Vollmar et al. | |
| 6,280,865 B1 | 8/2001 | Eisman et al. | |
| 6,517,963 B2 | 2/2003 | Lakshmanan et al. | |
| 6,660,069 B2 | 12/2003 | Sato et al. | |
| 6,821,664 B2 | 11/2004 | Parks et al. | |
| 6,833,207 B2 | 12/2004 | Joos et al. | |
| 6,866,950 B2 | 3/2005 | Connor et al. | |
| 6,887,601 B2 | 5/2005 | Moulthrop et al. | |
| 6,924,053 B2 | 8/2005 | McElroy | |
| 6,994,929 B2 | 2/2006 | Barbir et al. | |
| 7,011,903 B2 | 3/2006 | Benson et al. | |
| 7,014,940 B2 | 3/2006 | Hase et al. | |
| 7,041,272 B2 | 5/2006 | Keefer et al. | |
| 7,045,233 B2 | 5/2006 | McElroy et al. | |
| 7,097,925 B2 | 8/2006 | Keefer | |
| 7,132,182 B2 | 11/2006 | McElroy et al. | |
| 7,141,323 B2 | 11/2006 | Ballantine et al. | |
| 7,255,949 B2 | 8/2007 | Coors et al. | |
| 7,276,306 B2 | 10/2007 | Pham et al. | |
| 7,285,350 B2 | 10/2007 | Keefer et al. | |
| 7,416,800 B2 | 8/2008 | Benson et al. | |
| 7,482,078 B2 | 1/2009 | Sridhar et al. | |
| 7,520,916 B2 | 4/2009 | McElroy et al. | |
| 7,591,880 B2 | 9/2009 | Levan et al. | |
| 7,601,207 B2 | 10/2009 | Moulthrop et al. | |
| 7,604,684 B2 | 10/2009 | Menzel | |
| 7,674,539 B2 | 3/2010 | Keefer et al. | |
| 7,691,507 B2 | 4/2010 | Ballantine et al. | |
| 7,752,848 B2 | 7/2010 | Balan et al. | |
| 7,833,668 B2 | 11/2010 | Ballantine et al. | |
| 7,846,599 B2 | 12/2010 | Ballantine et al. | |
| 7,883,803 B2 | 2/2011 | McElroy et al. | |
| 7,968,237 B2 | 6/2011 | Grieve et al. | |
| 8,062,799 B2 | 11/2011 | Jahnke et al. | |
| 8,071,241 B2 | 12/2011 | Sridhar et al. | |
| 8,101,307 B2 | 1/2012 | McElroy et al. | |
| 8,158,290 B2 | 4/2012 | Penev et al. | |
| 8,241,400 B2 | 8/2012 | Grover | |
| 8,293,412 B2 | 10/2012 | McElroy | |
| 8,343,671 B2 | 1/2013 | Qi | |
| 8,530,101 B2 | 9/2013 | Qi | |
| 8,790,618 B2 | 7/2014 | Adams et al. | |
| 8,815,462 B2 | 8/2014 | Ghezel-Ayagh et al. | |
| 9,315,397 B2 | 4/2016 | Sivret | |
| 9,365,131 B2 | 6/2016 | Jamal et al. | |
| 9,455,458 B2 | 9/2016 | Yu et al. | |
| 9,455,463 B2 | 9/2016 | Berlowitz et al. | |
| 9,499,403 B2 | 11/2016 | Al-Muhaish et al. | |
| 9,502,728 B1 | 11/2016 | Farooque et al. | |
| 9,520,607 B2 | 12/2016 | Berlowitz et al. | |
| 9,531,024 B2 | 12/2016 | Pollica et al. | |
| 9,586,171 B2 | 3/2017 | Vanzandt et al. | |
| 9,861,931 B2 | 1/2018 | Kuopanportti et al. | |
| 2002/0142198 A1 | 10/2002 | Towler et al. | |
| 2003/0013448 A1 | 1/2003 | Dillinger et al. | |
| 2003/0143448 A1 | 7/2003 | Keefer | |
| 2003/0157383 A1 | 8/2003 | Takahashi | |
| 2003/0207161 A1 | 11/2003 | Rusta-Sallehy et al. | |
| 2004/0028979 A1 | 2/2004 | Ballantine et al. | |
| 2004/0146760 A1 | 7/2004 | Miwa | |
| 2004/0166384 A1 | 8/2004 | Schafer | |
| 2004/0197612 A1 | 10/2004 | Keefer et al. | |
| 2004/0221578 A1 | 11/2004 | Iijima et al. | |
| 2004/0229102 A1 | 11/2004 | Jahnke et al. | |
| 2005/0003247 A1 | 1/2005 | Pham | |
| 2005/0074657 A1 | 4/2005 | Rusta-Sallehy et al. | |
| 2005/0098034 A1 | 5/2005 | Gittleman et al. | |
| 2005/0123810 A1 | 6/2005 | Balan | |
| 2005/0227137 A1 | 10/2005 | Suga | |
| 2005/0233188 A1 | 10/2005 | Kurashima et al. | |
| 2005/0271914 A1* | 12/2005 | Farooque | H01M 8/0637 |
| | | | 429/410 |
| 2006/0115691 A1 | 6/2006 | Hilmen et al. | |
| 2006/0188761 A1 | 8/2006 | O'Brien et al. | |
| 2007/0009774 A1 | 1/2007 | Clawson et al. | |
| 2007/0031718 A1 | 2/2007 | Fujimura et al. | |
| 2007/0044657 A1 | 3/2007 | Laven et al. | |
| 2007/0065688 A1 | 3/2007 | Shimazu et al. | |
| 2007/0111054 A1 | 5/2007 | Gottmann et al. | |
| 2007/0141409 A1 | 6/2007 | Cho et al. | |
| 2007/0193885 A1 | 8/2007 | Benicewicz et al. | |
| 2007/0243475 A1 | 10/2007 | Funada et al. | |
| 2007/0246363 A1 | 10/2007 | Eisman et al. | |
| 2007/0246374 A1 | 10/2007 | Eisman et al. | |
| 2008/0063910 A1 | 3/2008 | Okuyama et al. | |
| 2008/0171244 A1 | 7/2008 | Okuyama et al. | |
| 2008/0241612 A1 | 10/2008 | Ballantine et al. | |
| 2008/0241638 A1 | 10/2008 | McElroy et al. | |
| 2008/0245101 A1 | 10/2008 | Dubettier-Grenier et al. | |
| 2008/0292921 A1 | 11/2008 | Lakshmanan et al. | |
| 2008/0299425 A1 | 12/2008 | Kivisaari et al. | |
| 2008/0311445 A1 | 12/2008 | Venkataraman et al. | |
| 2009/0068512 A1 | 3/2009 | Gofer et al. | |
| 2009/0084085 A1 | 4/2009 | Kawai | |
| 2009/0155637 A1 | 6/2009 | Cui et al. | |
| 2009/0155644 A1 | 6/2009 | Cui et al. | |
| 2009/0155645 A1 | 6/2009 | Cui et al. | |
| 2009/0155650 A1 | 6/2009 | Cui et al. | |
| 2009/0186244 A1 | 7/2009 | Mayer | |
| 2010/0028730 A1 | 2/2010 | Ghezel-Ayagh | |
| 2010/0047641 A1 | 2/2010 | Jahnke et al. | |
| 2010/0104903 A1 | 4/2010 | Gummalla et al. | |
| 2010/0126180 A1 | 5/2010 | Forsyth et al. | |
| 2010/0199559 A1 | 8/2010 | Hallett et al. | |
| 2010/0239924 A1 | 9/2010 | McElroy et al. | |
| 2010/0243475 A1 | 9/2010 | Eisman et al. | |
| 2010/0266923 A1 | 10/2010 | McElroy et al. | |
| 2010/0279181 A1 | 11/2010 | Adams et al. | |
| 2012/0000243 A1 | 1/2012 | Bough et al. | |
| 2012/0034538 A1 | 2/2012 | Jahnke et al. | |
| 2012/0058042 A1 | 3/2012 | Zauderer | |
| 2012/0167620 A1 | 7/2012 | Van Dorst et al. | |
| 2012/0189922 A1 | 7/2012 | Schmidt et al. | |
| 2012/0291483 A1 | 11/2012 | Terrien et al. | |
| 2013/0014484 A1 | 1/2013 | Caprile et al. | |
| 2013/0111948 A1 | 5/2013 | Higginbotham | |
| 2013/0259780 A1 | 10/2013 | Handagama et al. | |

(56) References Cited

U.S. PATENT DOCUMENTS

| | | | |
|---|---|---|---|
| 2014/0260310 A1* | 9/2014 | Berlowitz | F02C 6/18 60/780 |
| 2014/0302413 A1 | 10/2014 | Berlowitz | |
| 2014/0329160 A1* | 11/2014 | Ramaswamy | H01M 8/04723 429/434 |
| 2014/0352309 A1 | 12/2014 | Kim et al. | |
| 2015/0089951 A1 | 4/2015 | Barckholtz et al. | |
| 2015/0111160 A1 | 4/2015 | Brunhuber et al. | |
| 2015/0122122 A1 | 5/2015 | Mustapa et al. | |
| 2015/0191351 A1 | 7/2015 | Darde et al. | |
| 2015/0266393 A1 | 9/2015 | Jamal et al. | |
| 2015/0280265 A1 | 10/2015 | McLarty | |
| 2016/0248110 A1 | 8/2016 | Ghezel-Ayagh | |
| 2016/0265122 A1 | 9/2016 | Zhu et al. | |
| 2016/0351930 A1 | 12/2016 | Jahnke et al. | |
| 2016/0365590 A1 | 12/2016 | Zheng et al. | |
| 2016/0365594 A1 | 12/2016 | Zheng et al. | |
| 2017/0130582 A1 | 5/2017 | Hsu | |
| 2017/0141421 A1 | 5/2017 | Sundaram et al. | |
| 2017/0250429 A1 | 8/2017 | Diethelm et al. | |

FOREIGN PATENT DOCUMENTS

| | | | | |
|---|---|---|---|---|
| CN | 102422108 A | 4/2012 | | |
| CN | 104847424 A | 8/2015 | | |
| CN | 105050945 A | 11/2015 | | |
| EP | 1 306 916 A1 | 5/2003 | | |
| EP | 1 790 027 A2 | 5/2007 | | |
| EP | 2 589 902 A2 | 5/2013 | | |
| EP | 1 841 515 B1 | 6/2016 | | |
| EP | 2 011 183 B1 | 6/2016 | | |
| EP | 1 996 533 B1 | 7/2016 | | |
| EP | 1 273 061 B1 | 8/2016 | | |
| EP | 1 344 270 B1 | 6/2017 | | |
| EP | 2 589 908 A2 | 8/2018 | | |
| EP | 3 360 189 A1 | 8/2018 | | |
| IT | 20091246.6 A1 | 1/2011 | | |
| JP | S62-241524 A | 10/1987 | | |
| JP | 02-281569 | 11/1990 | | |
| JP | H04-334870 A | 11/1992 | | |
| JP | 41-1312527 A | 11/1999 | | |
| JP | H11-312527 A | 11/1999 | | |
| JP | 2001-023670 A | 1/2001 | | |
| JP | 2002-334714 A | 11/2002 | | |
| JP | 2004-171802 | 6/2004 | | |
| JP | 2005-179083 | 7/2005 | | |
| JP | 2007-018907 A | 1/2007 | | |
| JP | 2007-201349 A | 8/2007 | | |
| JP | 2008-507113 A | 3/2008 | | |
| JP | 2009-503788 A | 1/2009 | | |
| JP | 2009-503790 A | 1/2009 | | |
| JP | 2009-108241 A | 5/2009 | | |
| JP | 2010-055927 A | 3/2010 | | |
| JP | 2010-228963 A | 10/2010 | | |
| JP | 2011-141967 A | 7/2011 | | |
| JP | 2011-181440 A | 9/2011 | | |
| JP | 2011-207741 A | 10/2011 | | |
| JP | 2012-519649 A | 8/2012 | | |
| JP | 2012-531719 | 12/2012 | | |
| JP | 2016-115479 A | 6/2016 | | |
| KR | 1020130075492 A | 7/2013 | | |
| WO | WO-2007/015689 A2 | 2/2007 | | |
| WO | WO-2009/013455 A2 | 1/2009 | | |
| WO | WO-2009/059571 A1 | 5/2009 | | |
| WO | WO-2011/089382 A2 | 7/2011 | | |
| WO | WO-2012/176176 A1 | 12/2012 | | |
| WO | WO-2014/151207 | 9/2014 | | |
| WO | WO-2015/059507 A1 | 4/2015 | | |
| WO | WO-2015/116964 A1 | 8/2015 | | |
| WO | WO-2015/124183 A1 | 8/2015 | | |
| WO | WO-2015/124700 A1 | 8/2015 | | |
| WO | WO-2015116964 A1 * | 8/2015 | | C25B 1/04 |
| WO | WO-2015/133757 A1 | 9/2015 | | |
| WO | WO-2016/100849 A1 | 6/2016 | | |
| WO | WO-2016/196952 A1 | 12/2016 | | |
| WO | WO-2019/175850 | 9/2019 | | |

OTHER PUBLICATIONS

Extended European Search Report in EP17790107.1 dated Nov. 29, 2019 (7 pages).
International Preliminary Report on Patentability in PCT/US2017/027261 dated Nov. 8, 2018 (8 pages).
International Search Report and Written Opinion in PCT/US2017/027261 dated Jul. 3, 2017 (10 pages).
PCT International Search Report and Written Opinion dated Jun. 16, 2021 in International Application No. PCT/IB2021/051922.
Anonymous: 11 PROX—Wikipedia, Dec. 29, 2015 (Dec. 29, 2015), XP055569545, Retrieved from the Internet: URL:https://en.wikipedia.org/w/index.php?title=PROX&oldid=697317259 [retrieved on Mar. 14, 2019].
Communication pursuant to Article 94(3) EPC in EP 17786599.5 dated Jan. 30, 2020 (6 pages).
Extended European Search Report for EP17786599.5 dated May 20, 2019 (7 pages).
Extended European Search Report in EP17786629.0 dated Mar. 26, 2019 (9 pages).
First Office Action in JP 2018-554735 dated Nov. 11, 2019, with English machine translation (8 pages).
First Office Action in JP 2018-555215 dated Dec. 20, 2019, with English machine translation (8 pages).
International Preliminary Report on Patentability in PCT/US2016/035745 dated Dec. 14, 2017 (7 pages).
International Search Report and Written Opinion dated Aug. 24, 2017 in PCT/US2017/028594 (13 pages).
International Search Report and Written Opinion dated Jul. 14, 2017 for PCT/US2017/029667 (7 pages).
International Search Report and Written Opinion in PCT/US2016/035745 dated Sep. 30, 2016 (10 pages.
International Search Report and Written Opinion in PCT/US2017/028487 dated Jul. 10, 2017 (8 pages).
International Search Report and Written Opinion in PCT/US2017/028526 dated Jul. 17, 2017 (8 pages).
Non-Final Office Action in U.S. Appl. No. 16/096,596 dated May 13, 2019.
Non-Final Office Action on U.S. Appl. No. 15/298,316 dated Jun. 22, 2018 (4 pages).
Non-Final Office Action on U.S. Appl. No. 16/095,261 dated Jan. 4, 2021.
Notice of Preliminary Rejection in KR 10-2018-7033320 dated Apr. 17, 2020, with English translation (15 pages).
Office Action in CA Pat Appl No. 2988285 dated Feb. 5, 2018 (4 pages).
Office Action in CA Pat. Appl. 3021632 dated Oct. 3, 2019 (3 pages).
Office Action in JP 2017-563016 dated Jul. 13, 2018 (5 pages, no translation available).
U.S. Office Action in U.S. Appl. No. 14/732,032 dated Dec. 16, 2015 (11 pages).
U.S. Office Action in U.S. Appl. No. 14/732,032 dated May 13, 2016 (14 pages).
Extended European Search Report in EP21154960.5 dated May 17, 2021 (9 pages).
Notice of Preliminary Rejection in KR 10-2018-7033915 dated Apr. 17, 2020, with English translation (13 pages).

* cited by examiner

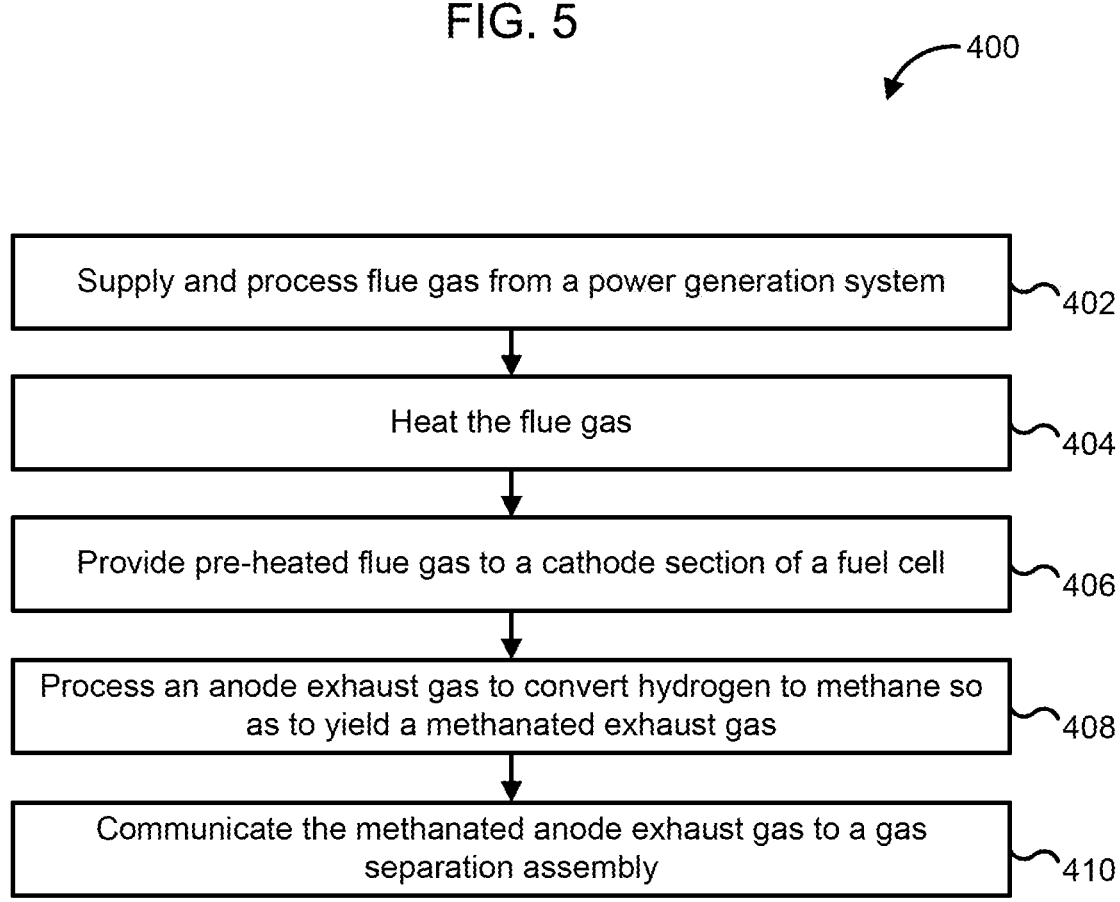

METHANATION OF ANODE EXHAUST GAS TO ENHANCE CARBON DIOXIDE CAPTURE

CROSS-REFERENCE TO RELATED APPLICATIONS

This application is a U.S. national stage entry of PCT/US2017/027261, filed on Apr. 12, 2017, which claims priority to U.S. Provisional Application No. 62/329,663, filed Apr. 29, 2016, the entire disclosures of which are hereby incorporated by reference in their entireties.

BACKGROUND

The present disclosure relates to fuel cell power production systems and, in particular, to a fuel cell power producing gas separation system and method.

A fuel cell is a device which directly converts chemical energy stored in a fuel into electrical energy through electrochemical reactions. Generally, a fuel cell comprises an anode and a cathode separated by an electrolyte, which serves to conduct electrically charged ions. Molten Carbonate Fuel Cells (MCFCs) operate by passing a reactant fuel gas through the anode, while oxidizing gas, such as carbon dioxide and oxygen, is passed through the cathode. Combustion-based power plants produce energy by combusting flammable hydrocarbon based fuels including coal, natural gas, biogas, and syngas.

As a result of the combustion process, combustion-based power plants generate flue gas, which is often disposed of by atmospheric emissions. Such emissions, however, are harmful to the environment because they contain carbon dioxide ($CO_2$) which contributes to global climate change. Increasing national and international regulations are placing strict regulations on the amount of $CO_2$ which may be released in the environments by such power generation systems.

Accordingly, a number of approaches have been used to control or limit carbon dioxide emissions from combustion-based power plants. However, separating the carbon dioxide from the post-combustion flue gas is highly expensive because of the significant loss of energy (power and/or heat) as the result of application of carbon dioxide capture systems to dilute CO2 containing flue gas. The flue gas including the carbon dioxide may be provided to an electrochemical fuel cell which may include a cathode, an anode and an electrolyte, for concentrating the carbon dioxide in the anode exhaust gas. The anode exhaust gas including the carbon dioxide from the flue gas may be communicated to a compressor, condenser and/or chiller to liquefy and separate the carbon dioxide from the other gases included in the anode exhaust gas. Hydrogen gas and other non-condensible gases included in the anode exhaust gas will, however, hamper capturing of the carbon dioxide and increase the cost of compression and/or condensation via refrigeration (e.g., by increasing the energy used for compression and/or condensation) or reducing the amount of CO2 captured.

SUMMARY

Embodiments described herein generally relate to systems and methods for capturing carbon dioxide by use of fuel cell systems, and in particular to a fuel cell power producing gas separation system that may be integrated with a fossil fuel device, facility or installation (e.g., a power plant, boiler or any other combustor such as kilns in a cement factory and coke ovens in the steel industry) configured to efficiently separate various gases included in a flue gas, particularly carbon dioxide. The hydrogen included in the fuel cell anode exhaust gas is methanated so as to increase the relative concentration of carbon dioxide in the anode exhaust gas and reduce the volume of water separated anode exhaust gas.

In some embodiments, a fuel cell power producing system is configured to be integrated with a fossil fueled installation so as to utilize flue gas produced by the fossil fueled installation. The flue gas includes carbon dioxide and oxygen output by the fossil fueled installation. The power producing system includes an anode section and a cathode section. The flue gas containing carbon dioxide is communicated to the cathode section of the fuel cell. The anode section produces an anode exhaust gas including carbon dioxide, water, hydrogen, carbon monoxide and other gases. The anode exhaust gas is communicated to a gas separation assembly. The gas separation assembly includes a methanator configured to convert at least a portion of hydrogen included in the anode exhaust gas to methane so as to generate a methanated anode exhaust gas. The methanated anode exhaust gas has a higher ratio of carbon dioxide to non-condensable gases relative to a non-methanated exhaust gas.

In some embodiments, the gas separation assembly may include a chiller assembly for cooling the anode exhaust to a predetermined temperature so as to liquefy carbon dioxide in the methanated anode exhaust. In some embodiments, waste heat produced by the fuel cell is utilized to drive the chiller assembly. In some embodiments, the inlet flue gas supplied to the cathode section of the fuel cell contains exclusively all or part of the flue gas output by the fossil fueled installation, facility or device. In certain embodiments, the chiller assembly may include one or more chillers or knock out pots. In some embodiments, the gas separation assembly recovers waste heat from cathode exhaust output by the cathode section of the fuel cell and utilizes at least a portion of the recovered waste heat to drive the chiller assembly.

In some embodiments, the gas separation assembly further includes a water removal assembly for separating water from the anode exhaust and for outputting water-separated anode exhaust, and the chiller assembly receives the water-separated anode exhaust. The gas separation assembly further includes a compressor for compressing the water-separated anode exhaust output from the water removal assembly prior to the water-separated anode exhaust being conveyed to the chiller assembly.

In some embodiments, the gas separation assembly is configured to receive a methanated anode exhaust gas from the power producing system. The compressor may compress the methanated anode exhaust gas to at least 250 psi (about 1.72 MPa) and the chiller assembly chills the methanated anode exhaust gas to less than −40° C. The methanated anode exhaust gas causes the gas separation assembly to provide a 10-20% increase in carbon dioxide capture and greater than a 20% decrease in compressor power, which includes the power required to operate the compressor assembly, relative to the gas separation assembly operating on non-methanated anode exhaust gas.

In some embodiments, the power producing system also includes an oxidizer that receives flue gas output by the fossil fueled installation, facility or device and at least part of the residual fuel gas separated by the gas separation device. The oxidizer oxidizes the residual fuel to heat the flue gas, where the oxidizer outputs heated flue gas to the cathode section of the fuel cell. In some embodiments, part of the residual fuel is recycled to the anode. The power producing system also includes at least one heat exchanger for utilizing waste heat in the cathode exhaust for heating at least one of fuel gas to be input to the anode section and flue gas output by the fossil fueled installation, facility or device. In some embodiments, the fuel cell is an internal reforming Molten Carbonate Fuel Cell (MCFC), while in other embodiments the fuel cell is an external reforming MCFC.

In some embodiments, a non-methanated anode exhaust gas includes 20-25 mole % hydrogen and other non-condensable gases and 65-75 mole % of carbon dioxide inclusive, and the methanated anode exhaust gas includes about 5-10 mole % of hydrogen and other non-condensable gases and 75-85 mole % of carbon dioxide.

These and other advantageous features will become apparent to those reviewing the disclosure and drawings.

BRIEF DESCRIPTION OF THE DRAWINGS

FIG. 5 is a schematic flow diagram of an example method for increasing a concentration of carbon dioxide in an anode exhaust gas by methanating at least a portion of the hydrogen included in the exhaust gas.

DETAILED DESCRIPTION

Embodiments described herein generally relate to systems and methods for capturing carbon dioxide produced by fuel cell systems, and in particular to an integrated power production system or fuel cell system that may be integrated with a fossil fuel device, facility or installation (e.g., a power plant, boiler or any other combustor such as kilns in a cement factory and coke ovens in the steel industry). The systems and methods described herein are configured to efficiently separate various gases included in an anode exhaust gas, particularly carbon dioxide. The hydrogen included in the anode exhaust gas is methanated so as to increase a relative concentration of carbon dioxide in the anode exhaust gas.

As used herein, the term "methanation" or "methanated" refers to the conversion of at least a portion of hydrogen and $CO_2$ included in an anode exhaust gas to methane.

Figure 1A:
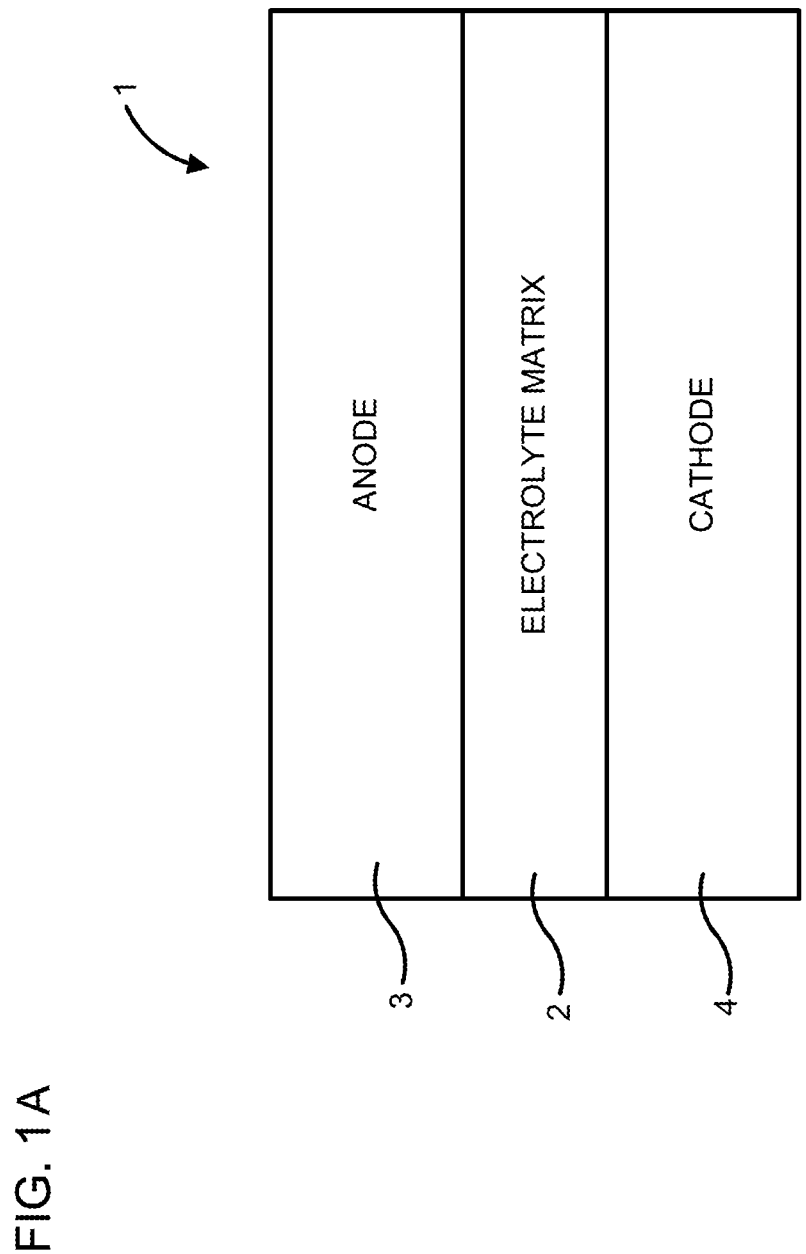
FIG. 1A is a schematic illustration of a fuel cell, according to an embodiment.

FIG. 1A is a schematic illustration of a fuel cell 1. The fuel cell 1 comprises an electrolyte matrix 2, an anode 3, and a cathode 4. The anode 3 and the cathode 4 are separated from one another by the electrolyte matrix 2. Flue gas from a combustion exhaust supply unit may be provided to the cathode 4 as oxidant gas. In the fuel cell 1, in the cathode, $CO_2$ and $O_2$ in the form of $CO_3^=$ ions are transferred from the cathode to the anode and in the anode, fuel gas and oxidant gas undergo an electrochemical reaction in the presence of an electrolyte (e.g., a carbonate electrolyte) present in the pores of the electrolyte matrix 2.

Figure 1B:
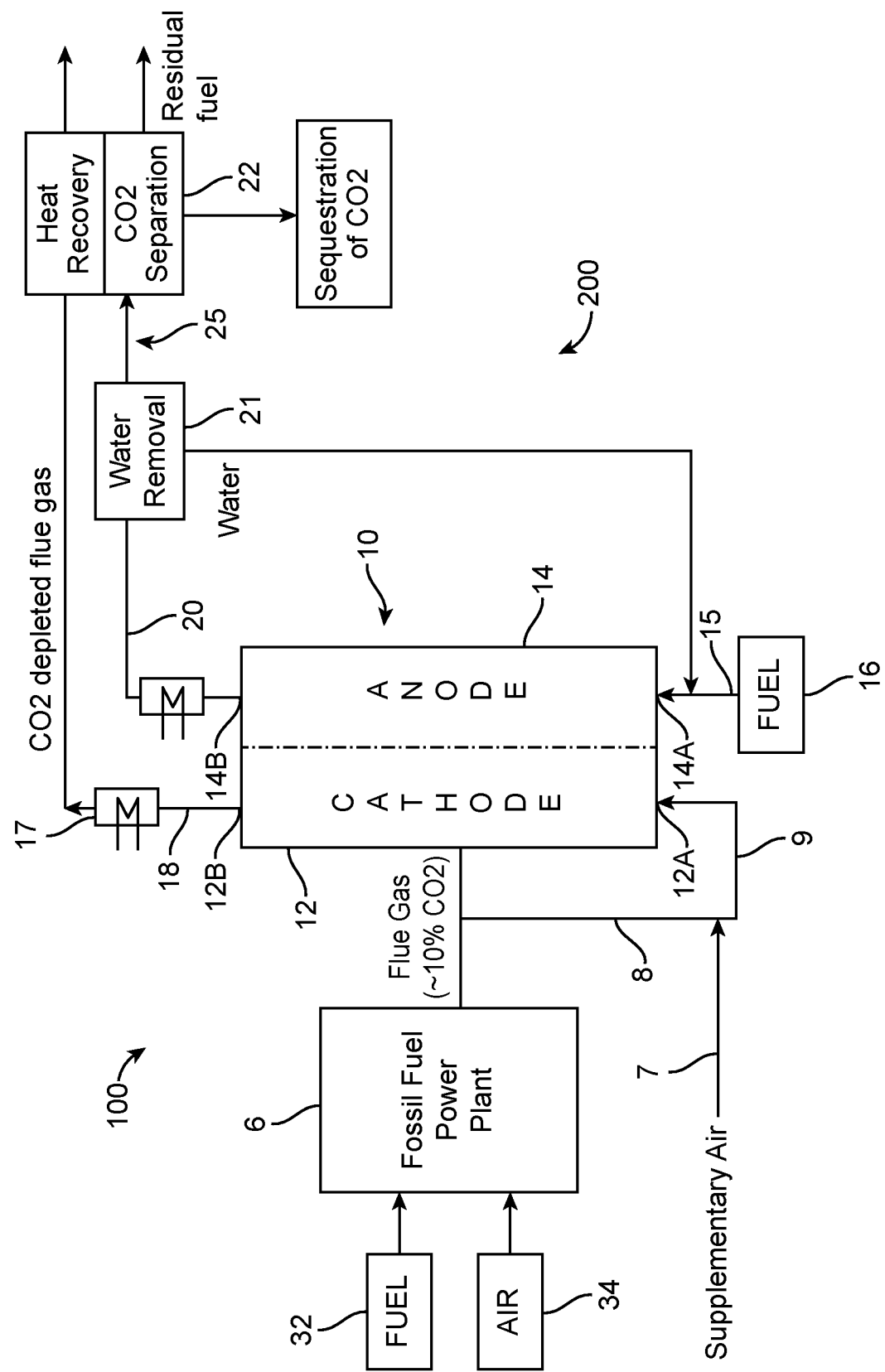
FIG. 1B is a schematic illustration of a power production system, according to an embodiment.

In some embodiments, the fuel cell 1 may comprise a fuel cell stack assembly in which multiple individual fuel cells 1 are stacked and connected in series. FIG. 1B is a schematic illustration of an integrated power production system 100 according to an embodiment. The power production system 100 comprises a flue gas generating assembly 6, which includes one or more of a fossil fueled installation, facility or device, a boiler, a combustor, a furnace and kiln in a cement factory (hereinafter "fossil fueled installation, facility or device"). The flue gas generating assembly may be configured to burn a fossil fuel (e.g., coal, natural gas, gasoline, diesel, etc.) and produce a flue gas including carbon dioxide.

The power production system 100 includes a fuel cell assembly 10 (e.g., a carbonate fuel cell assembly) fluidly coupled to the flue gas generating assembly 6 and configured to receive the flue gas therefrom. The power production system 100 also includes a power producing gas separation and sequestration system that includes a carbonate fuel cell assembly 10 and a gas separation assembly 25 in accordance with illustrative embodiments. As shown in FIG. 1B, the fuel cell assembly 10 includes a cathode section 12 and an anode section 14. In some embodiments, the fuel cell assembly 10 may include an internally reforming or a direct molten carbonate fuel cell assembly in which the fuel for the anode is internally reformed in the assembly. In other embodiments, the fuel cell assembly 10 may include an externally reforming carbonate fuel cell assembly can also be employed in which case a reformer would be used to reform the fuel prior to delivery to the fuel cell anode section.

The flue gas generation assembly 6 and the fuel cell assembly 10 of the power producing gas separation and sequestration system may be arranged in tandem as shown in FIG. 1B such that the cathode section 12 of the fuel cell assembly 10 is supplied with the flue gas from the flue gas generation assembly 6. In some embodiments, the flue gas from the flue gas generation assembly is supplied exclusively to the cathode section 12. For example, a fossil fuel such as coal, natural gas or other hydrocarbon fuel is delivered to the fossil fueled installation, facility or device 6 from a fossil fuel supply 32 along with air delivered from an air supply 34. The fossil fuel and air may undergo a combustion reaction in the flue generation device 6 producing power and resulting in an output flue gas exhaust. The flue gas exhaust may comprise approximately 3-15% carbon dioxide, 1-20% water (preferably 10-20%), and 3-15% oxygen (preferably 5-15%), with the balance nitrogen. The exact amounts of these components depends upon the type of fossil fuel and the amount of air from the air supply 34. The oxygen content can be varied by adjusting the air supply 34 or by addition of supplementary air 7 to the flue gas 8 before entering in the fuel cell cathode section 12. The supplementary air may be used to increase the oxygen portion of the combined stream 9, in case there is not sufficient oxygen in the flue gas 8 required for the fuel cell operation.

As shown in FIG. 1B, a line 9 fluidly couples a part or all of the flue exhaust gas to the inlet 12A of the cathode section 12 so that the flue gas or oxidant gas supply to the cathode inlet 12A includes the flue gas exhaust. In some embodiments, the flue gas in combination with a possible supplementary air stream is the exclusive oxidant gas supply to the cathode inlet 12A. At the same time, fuel from a supply 16, such as coal gas, natural gas or other hydrogen-containing fuel, is delivered over a line 15 to an inlet 14A of the anode section 14. In the fuel cell assembly 10, the oxidant gas in the cathode section 12 comprising flue gas exhaust and the reformed hydrogen in the anode section 14 undergo an electrochemical reaction to produce a power output. Also, this electrochemical reaction results in a substantial portion (approximately 65 to 85% or more) of the carbon dioxide in the flue gas being transferred from the cathode section 12 to the anode section 14 of the fuel cell 10.

Expanding further, the carbon dioxide and oxygen in the flue gas react in the cathode section 12 of the fuel cell assembly 10 to produce carbonate ions which are carried to the anode section 14 of the fuel cell 10 through the fuel cell electrolyte. At the anode section 14, the carbonate ions are reduced with hydrogen from the fuel to produce water and carbon dioxide. The net result is the above-mentioned transfer of a substantial portion of the carbon dioxide in the flue gas from the cathode section 12 to the anode section 14. Anode exhaust gas at the outlet 14B of the anode section 14 of the fuel cell 10 is thus, high in concentration of carbon dioxide, thereby permitting the carbon dioxide gas to be more easily and efficiently captured and sequestered using the $CO_2$ separation and sequestration systems described herein. In some embodiments, a concentration of carbon diode in the anode exhaust gas in range of 60-75 mole % (dry basis) inclusive of all ranges and values therebetween. In alternative embodiments, a higher concentration may be achieved.

In the embodiment shown in FIG. 1B, flue gas depleted of carbon dioxide exits the cathode section 12 through a cathode outlet 12B via a line 18, and anode exhaust gas containing predominantly carbon dioxide as well as unreacted hydrogen, carbon monoxide, water vapor and trace amounts of other gases exits the anode outlet 14B and is conveyed by line 20 to the gas separation assembly 25. In some embodiments, the gas separation assembly 25 may include at least a water removal assembly 21 for recovering water from the anode exhaust and a carbon dioxide separation assembly 22 for separating carbon dioxide from the remaining anode exhaust gas. Moreover, because the cathode gas exits the fuel cell assembly 10 at high temperature, all or part of the detectable heat from this stream may be recovered by one or more heat recovery units 17 and may be used for pre-heating gases incoming into the fuel cell assembly 10. In some embodiments, heat may be recovered from the anode exhaust gas exiting the fuel cell anode section 14 prior to being conveyed to the gas separation assembly 25.

Figure 2:
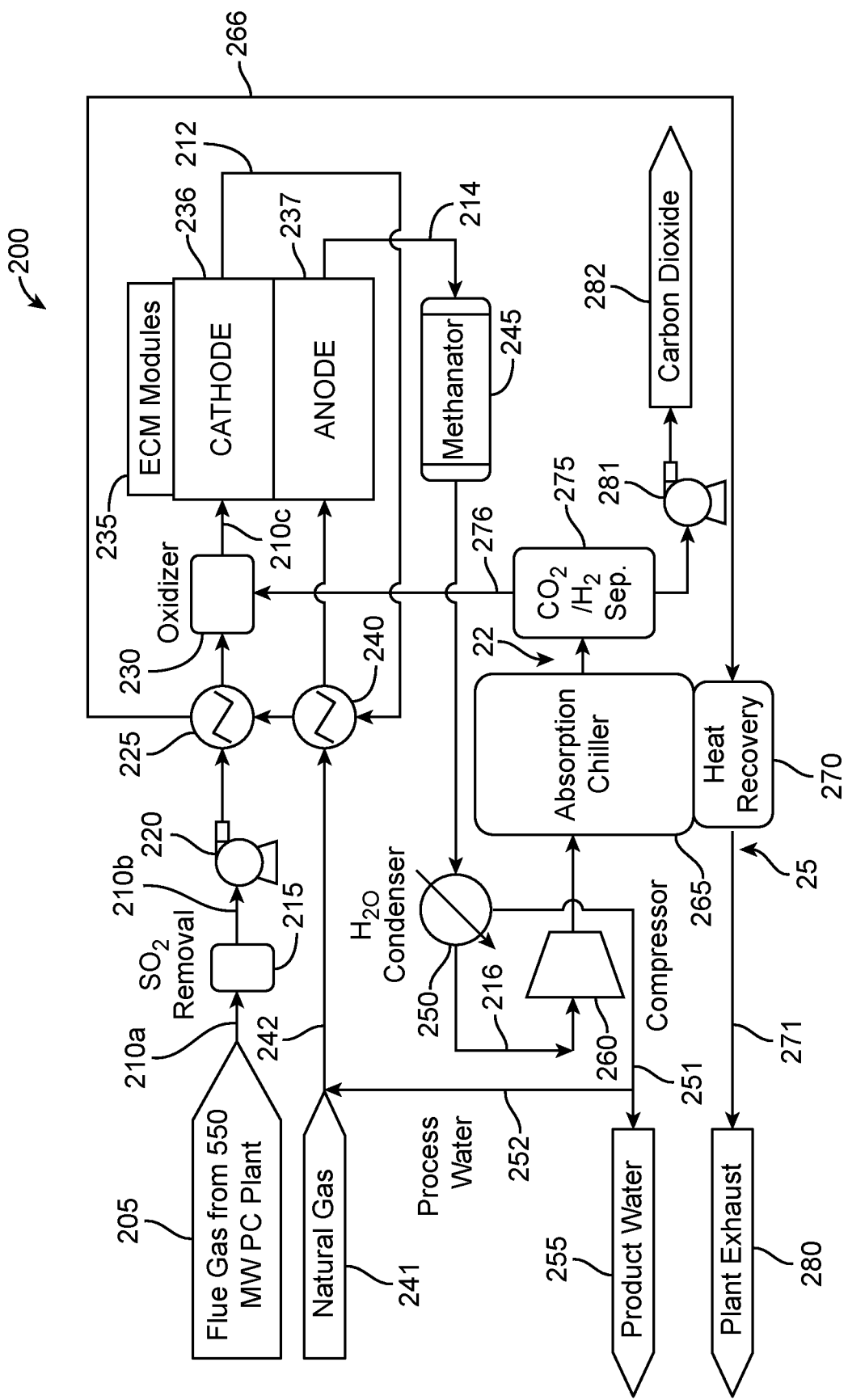
FIG. 2 is a schematic illustration a power producing system, and an embodiment of a gas separation assembly including a methanator fluidly coupled to the power production system.

FIG. 2 is a more detailed schematic illustrations of the power producing gas separation and sequestration system 200, according to an embodiment. The system 200 receives, flue gas from a combustion exhaust supply 205 (e.g., the flue gas generation assembly 6). The flue gas mainly contains carbon dioxide, water, oxygen and nitrogen, and may be produced from combustion of flammable hydrocarbons, including, for example, coal, natural gas, biogas, syngas, and other hydrocarbonaceous fuels such as ethanol, in a combustion-based power plant, a fossil fueled installation, facility or device or the like. The combustion exhaust supply 205 supplies the flue gas exhaust through a gas stream conduit 210a to a trace contaminant/pollutant gas removal device 215. The trace contaminant/pollutant gas removal device 215 removes combustion by-products including sulfur oxide gases, such as $SO_2$, mercury, and particulates. Nitrogen oxide gases (NOx) need not be removed since they do not impact the performance of fuel cell and most of the NOx will be destroyed in the fuel cell cathode. As shown in FIG. 2, the trace contaminant/pollutant gas removal device 215 outputs cleaned flue gas to a flue gas blower 220 through the gas stream conduit 210b. The flue gas blower 220 boosts the pressure of the cleaned flue gas such that the flue gas is pushed through the system 200.

The flue gas blower 220 outputs the flue gas to a first heat exchanger 225, which is configured to heat the flue gas to a temperature of approximately 500° C.-650° C. In some embodiments, the first heat exchanger 225 may also remove heat from the flue gas and divert the heat for heat recovery. As shown in FIG. 2, the first heat exchanger 225 receives the cleansed flue gas from the combustion exhaust supply 205 through the gas stream conduit 210b and also receives cathode exhaust output from a cathode side 236 of the fuel cell 235. After the flue gas is heated to the desired temperature in the first heat exchanger 225, the heated flue gas is output to an oxidizer assembly including an oxidizer 230. The oxidizer 230 also receives gas containing fuel, such as a portion of the anode exhaust or all or a portion of residual fuel separated from the anode exhaust gas in a gas separation device 275 described herein below. In some embodiments, it also receives part of the natural gas feed 241. In the oxidizer 230, fuel containing gas is oxidized in the presence of flue gas, thereby further heating the flue gas. The oxidizer 230 outputs the further heated flue gas through the gas stream conduit 210c to the fuel cell 235.

The fuel cell 235 comprises the cathode section 236 and the anode section 237. The fuel cell 235 may include an internal reforming Molten Carbonate Fuel Cell (MCFC), an external reforming fuel cell, or a combination thereof for reforming the fuel before it is conveyed to the anode section 237. The cathode section 236 is coupled to the combustion exhaust supply 205 via the gas stream conduits 210a-c and receives the flue gas from the combustion exhaust supply 205 through the gas stream conduits 210b-c after the flue gas has been processed in the trace contaminant/pollutant gas removal device 215 and heated in the first heat exchanger 225 and the oxidizer 230. As shown in FIG. 2, the cathode section 236 receives exclusively the flue gas, or processed flue gas, provided from the combustion exhaust supply 205. However, in other embodiments, the flue gas or the processed flue gas may be mixed with air or oxidant gas from other sources.

After undergoing an electrochemical reaction in the fuel cell 235, the cathode section 236 outputs the cathode exhaust through a gas stream conduit 212 to a second heat exchanger 240 which also receives fuel, such as natural gas, from a fuel supply 241 and water 252 through a fuel supply conduit 242. Any suitable fuel may be used including but not limited to natural gas, coal-derived syngas, anaerobic digester gas, and renewable fuels such as ethanol or hydrogen. In some embodiments, harmful fuel cell contaminants such as sulfur-bearing species may be removed from the fuel gas before usage in the fuel cell 235. In the second heat exchanger 240, the received fuel is heated using waste heat from the cathode exhaust to a temperature of approximately 450-650 degrees Celsius, and heated fuel and steam is then conveyed from the second heat exchanger 240 to the anode section 237 of the fuel cell 235. The second heat exchanger 240 also outputs cooled cathode exhaust which is then conveyed through the first heat exchanger 225 to pre-heat the cleaned flue gas.

As shown in FIG. 2, the anode section 237 receives pre-heated fuel, which may be humidified by adding water via conduit 252, and after the gases undergo an electrochemical reaction in the fuel cell 235, the anode section 237 outputs anode exhaust gas to the gas separation assembly 25 via a conduit 214. The gas separation assembly 25 includes a methanator 245, a water removal assembly 250, a compressor 260 and a carbon dioxide separation assembly 22, including a chiller assembly 265 driven by waste heat of the fuel cell 235 and a flash drum 275 or another suitable gas-liquid separation device. Although not shown, partial cooling of the anode exhaust gas is required prior to entering the methanator as lower temperatures favor the equilibrium formation of methane. Because the methanation reaction is exothermic, multiple methanators with cooling between stages may be used.

The methanator 245 is configured to convert at least a portion of the hydrogen included in the anode exhaust gas to methane via the following reactions;

$$4H_2 + CO_2 \dashrightarrow CH_4 + 2H_2O \quad (1)$$

$$2H_2 + CO \dashrightarrow CH_4 + H_2O \quad (2)$$

which produces a methanated anode exhaust gas, i.e., an anode exhaust gas having a higher percentage of methane and a lower percentage of hydrogen. This leads to the exhaust gas having a lower total volume, especially after the water is condensed and removed and a higher concentration of carbon dioxide relative to the non-condensables in the anode exhaust gas.

Expanding further, the hydrogen and other non-condensable gases present in the anode exhaust gas interfere with the concentration of carbon dioxide by the fuel cell anode exhaust which may also lead to increased cost of compression and chilling of the carbon dioxide downstream of the fuel cell. Methanating the hydrogen included in the anode exhaust gas reduces 4 moles of inert hydrogen into 1 mole of inert methane. Because anode exhaust gas generally includes hydrogen+carbon monoxide in the range of about 25% and about 75% carbon dioxide on a dry basis, this increases the percent concentration of carbon dioxide in the anode exhaust gas from about 75% to about 85% and reduces the volume of the anode exhaust gas by approximately 15%. In some embodiments, methanating the anode exhaust gas may increase a concentration of carbon dioxide in the anode exhaust gas in the range of 10-20% inclusive of all ranges and values therebetween.

The methanator 245 may have any suitable configuration and/or structure and may include a catalyst formulated to promote conversion of hydrogen to methane. Suitable catalysts may include but are not limited to ruthenium, cobalt, nickel, iron, any other suitable catalyst or a combination thereof. The methanator 245 may be a single stage or a multiple stage methanator. The methanated anode exhaust gas from the methanator 245 is then conveyed to the water removal assembly 250, including a condenser or the like, where water present in the methanated anode exhaust gas is separated from the remaining gases through condensation.

The water removal assembly 250 outputs condensed water through a water removal conduit 251 from which the condensed water is recycled back to the system 200 or output to a product water collector 255 for use outside the system 200 and/or recycling back to the system. As shown in FIG. 2, all or a portion of the condensed water may be recycled for fuel humidification by routing the water to the fuel supply conduit 242 via the water recycling conduit 252. As also shown, the remaining portion of the condensed water is either output from the system 200 or collected in a product water collector 255 and may be recycled back to the system 200 when needed.

The condenser assembly 250 outputs water-separated anode exhaust through the gas stream conduit 216 to the compressor 260, which compresses the anode exhaust gas to a suitable pressure—for example, a pressure of about 200 psi (or 1.38 MPa) or higher. The higher the pressure of the compressor 260, the higher the temperature that can be offered by the chiller. The design points are a trade-off between a larger and more cooling chiller and higher compression power consumption. The compressor 260 outputs the compressed anode exhaust to the chiller assembly 265. In some embodiments, the compressor 260 is a multiple stage compressor with interstage cooling. The chiller assembly 265 may include one or more devices that use heat to drive cooling of the compressed water-separated anode exhaust so as to cause separation of the individual gases within the anode exhaust. As shown in FIG. 2, the chiller assembly 265 comprises one or more absorption chillers, i.e., one or more absorption refrigerators. In some embodiments, an assembly of a plurality of absorption chillers connected in series may be used, wherein each of the absorption chillers receives all or a portion of the compressed water-separated anode exhaust from the compressor 260.

In the chiller assembly 265, water-separated compressed anode exhaust gas is cooled to a predetermined temperature while maintaining its compressed state. In particular, the anode exhaust gas is cooled to a temperature of about −40° C. or cooler, while maintaining the high pressure of the gas, i.e., at about 200 psi (about 1.38 MPa) or higher. At this temperature and pressure, most of the carbon dioxide present in the anode exhaust is liquefied causing separation of the carbon dioxide from other gases, such as residual hydrogen and methane fuel present in the anode exhaust gas. The higher $CO_2$ concentration, resulting from methanation, increases the amount of $CO_2$ liquefied. The chiller assembly 265 utilizes waste heat generated by the fuel cell 237 and recovered from fuel cell exhaust in a heat recovery assembly 270. Specifically, cathode exhaust is conveyed to the heat recovery assembly 270 via conduit 266 after being passed through the second heat exchanger 240 and through the first heat exchanger 225. The heat recovery assembly 270 recovers the remaining waste heat from the cathode exhaust and utilizes the recovered waste heat to drive the chiller assembly 265.

After being conveyed through the heat recovery assembly 270, the cathode exhaust is removed from the system 200 and emitted to the atmosphere by a system exhaust duct 280 through an exhaust conduit 271. In some embodiments, further heat is recovered by preheating the flue gas feed prior to heat exchanger 225. The chiller assembly 265 outputs the cooled anode exhaust, in which carbon dioxide has been liquefied while the residual fuel is in gas state, to the gas separation device 275. The gas separation device 275, also called a flash drum, is a tank that separates the liquefied carbon dioxide from the residual fuel gas and outputs the separated nearly pure and liquefied carbon dioxide to a sequestration assembly 282 such as an underground storage unit. A pump 281 or the like may be used to facilitate the flow of separated and liquefied pure carbon dioxide from the gas separation device 275. For example, the pump 281 may be utilized to increase the liquefied carbon dioxide pressure to >2200 psi (about 15.17 MPa) in order to transform the carbon dioxide to a super-critical state to facilitate its long distance transportation to the sequestration site.

In some embodiments, the separated carbon dioxide is utilized by other processes and applications such as Enhanced Oil Recovery (EOR), production of chemicals, and food production in the food industry. The gas separation assembly 275 also outputs the separated residual fuel gas, such as hydrogen and methane, through a fuel gas recycling conduit 276. In the illustrative embodiment of FIG. 2, the fuel gas recycling conduit 276 is coupled to the oxidizer unit 230 so that separated residual fuel output is output from the gas separation device 275 to the oxidizer unit 230 for pre-heating of the flue gas. In other embodiments, the separated residual fuel gas may be utilized as a syngas byproduct in other processes including but not limited to refineries, combustion turbines, and other fuel cells, which are not contained within the system 200 or recycled to the anode feed.

Methanation of the anode exhaust gas by the gas separation assembly before compression and chilling may increase the concentration of $CO_2$ in the exhaust gas (e.g., in a range of 10%-20%) as well as reduce the power and thereby cost for compression and/or chilling (or condensing) the anode exhaust gas for extracting the carbon dioxide therefrom (e.g., by about 15%). For example, Table I summarizes various parameters of a non-methanated anode exhaust gas, an anode exhaust gas subjected to one stage methanation and subjected to two stage methanation.

TABLE I

Various parameters of non-methanated, one stage methanated and two stage methanated anode exhaust (AE) gas

| 459 Name | AE Gas | | One stage methanation | | Two stage methanation | |
| --- | --- | --- | --- | --- | --- | --- |
| Molar flow lbmol/hr | 45.77 | | 43.62 | | 42.63 | |
| Mass flow lb/hr | 1,305.5 | | 1,305.5 | | 1,305.5 | |
| Temp F. | 1032° | | 774° | | 180° | |
| Pres psia | 15.43 | | 15.04 | | 14.71 | |
| IWCg | 20.18 | | 9.63 | | 0.38 | |
| Enth MMBtu/hr | −5.056 | | −5.295 | | −5.583 | |
| Vapor mole fraction | 1.000 | | 1.000 | | 1.000 | |
| SCFM | 289.46 | | 275.86 | | 269.62 | |
| Average mol wt | 35.53 | | 29.93 | | 30.62 | |
| Actual dens lb/ft3 | 0.0275 | | 0.0340 | | 0.0660 | |
| Actual vol ft3/min | 791.25 | | 639.65 | | 329.79 | |
| Cp Btu/lbmol-F. | 10.32 | | 10.24 | | 9.09 | |
| Cp/Cv | 1.239 | | 1.241 | | 1.295 | |
| Z factor | 1.0000 | | 0.9997 | | 0.9949 | |
| Visc cP | 0.0342 | | 0.0289 | | 0.0154 | |
| Th cond Btu/hr-ft-F. | 0.0460 | | 0.0345 | | 0.0140 | |
| Components | lb-mole/hr | mole % | lb-mole/hr | mole % | lb-mole/hr | mole % |
| Hydrogen | 4.57 | 16.64 | 2.47 | 9.75 | 0.75 | 3.16 |
| Methane | 0.02 | 0.06 | 1.09 | 4.30 | 1.58 | 6.70 |
| Carbon Monoxide | 2.48 | 9.02 | 0.27 | 1.07 | 0.03 | 0.11 |
| Carbon Dioxide | 20.34 | 74.10 | 21.47 | 84.68 | 21.23 | 89.82 |
| Water | | 0.00 | | 0.00 | | 0.00 |
| Nitrogen | 0.05 | 0.18 | 0.05 | 0.19 | 0.05 | 0.21 |
| Total | 27.45 | 100.00 | 25.36 | 100.00 | 23.63 | 100.00 |
| | 100% | | 92% | | 86% | |

The mole % of $CO_2$ increases from about 74% in the non-methanated anode exhaust gas to about 85% in the one stage methanated exhaust gas, and to about 90% in the two stage methanated anode exhaust gas. Furthermore, the flow rate in lb-mole/hr decreases to 92% in the one stage methanation and to 86% in the two stage methanation. The lower flow rate reduces the power required for downstream compression and/or chilling of the anode exhaust gas, thereby reducing the compression and/or chilling cost.

Figure 3:
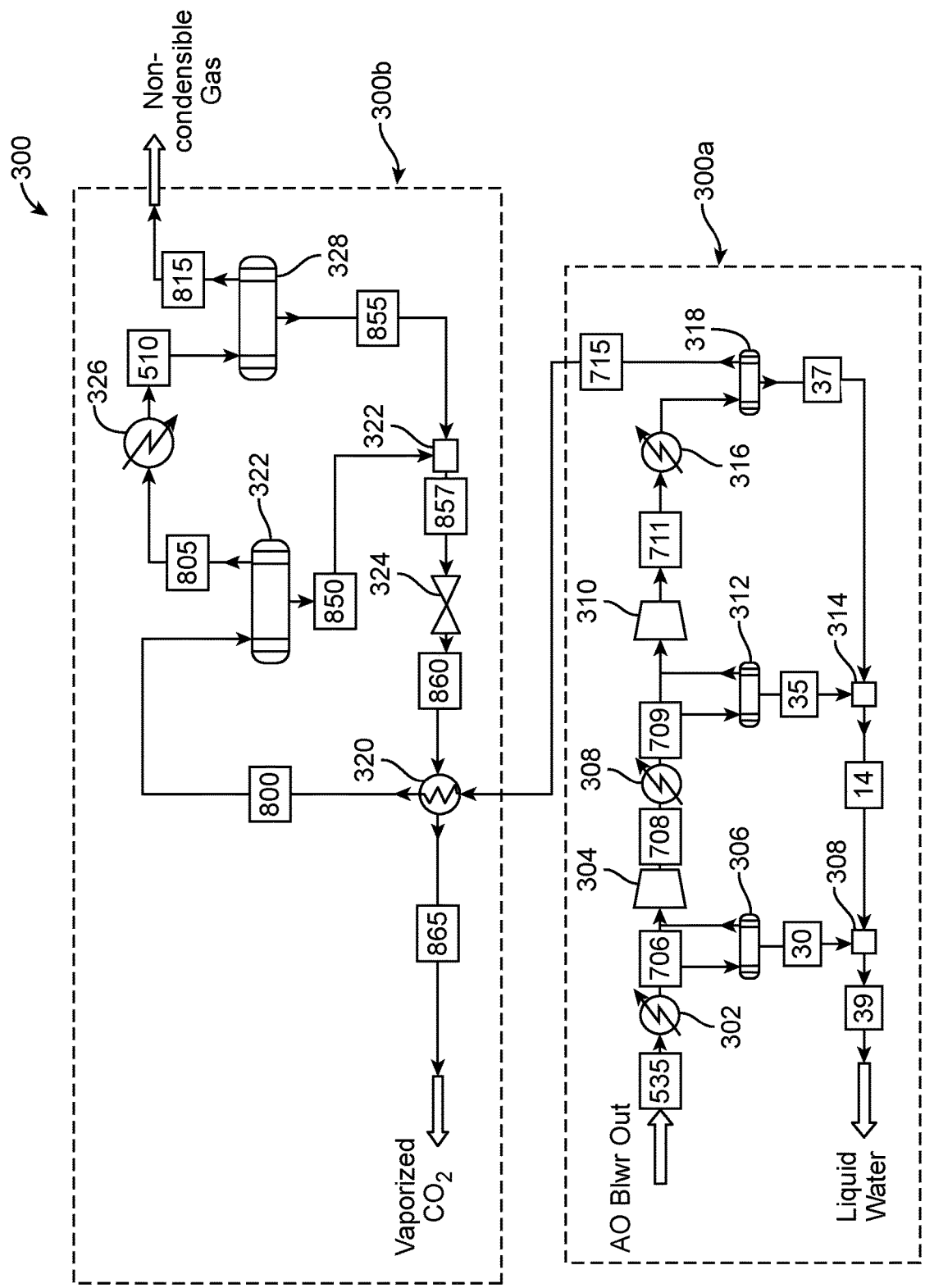
FIG. 3 is a schematic illustration of another embodiment of a gas separation assembly.

FIG. 3 is a schematic block diagram of another embodiment of a gas separation assembly 300 that may be used to separate carbon dioxide from methanated or non-methanated anode exhaust gas (e.g., anode exhaust gas produced by the fuel cell assembly 1/10/235). The gas separation assembly 300 comprises a compression loop 300a and a chilling loop 300b.

A methanated or non-methanated anode exhaust gas stream 535 is provided to a first cooler 302 and then to the low pressure (LP) compressor 304 as stream 706. Water included in the anode exhaust stream is separated via a first water separator 306, and extracted as a first water stream 30.

Anode exhaust gas stream 708 emerging from the LP compressor 304 is communicated via a second cooler 308 as stream 709 to a high pressure (HP) compressor 310. A second water separator 312 collects water included in the HP exhaust stream as second water stream 35.

A high pressure anode exhaust gas stream 711 emitted by the HP compressor 310 is communicated via a third cooler 316 and through a third water separator 318 to the chilling loop 300b as stream 715. The third water separator 318 removes substantially all of the remaining water from the high pressure stream which is extracted as third water stream 37. Water streams from the various separators are mixed together in mixers 330 and 314 and exported from the gas separation assembly 300 as liquid water stream 39.

In the embodiment shown, the high pressure anode exhaust gas stream 715 having a temperature of about 100 degrees Fahrenheit is communicated through a heat exchanger 320 which cools the high pressure anode exhaust gas. A cooled high pressure anode exhaust gas stream 800 having a temperature of less than −30 degrees Fahrenheit is communicated to a first separation device (knock out pot) 322. The chiller 320 cools the high pressure anode exhaust gas so as to generate a first liquid $CO_2$ stream 850.

An anode exhaust gas stream 805 emanating from the first separation device (knock out pot) 322 is then communicated via a fourth cooler/chiller 326 as stream 510 to a second separation device (knock out pot) 328. The second chiller 326 liquefies additional carbon dioxide in the anode exhaust gas so as to generate a second liquid $CO_2$ stream 855. The remaining anode exhaust gas stream 815 which cannot be easily condensed any further is removed from the gas chilling loop 300b and may be recycled back to a fuel cell (e.g., the fuel cell 10 or 235).

Figure 4:
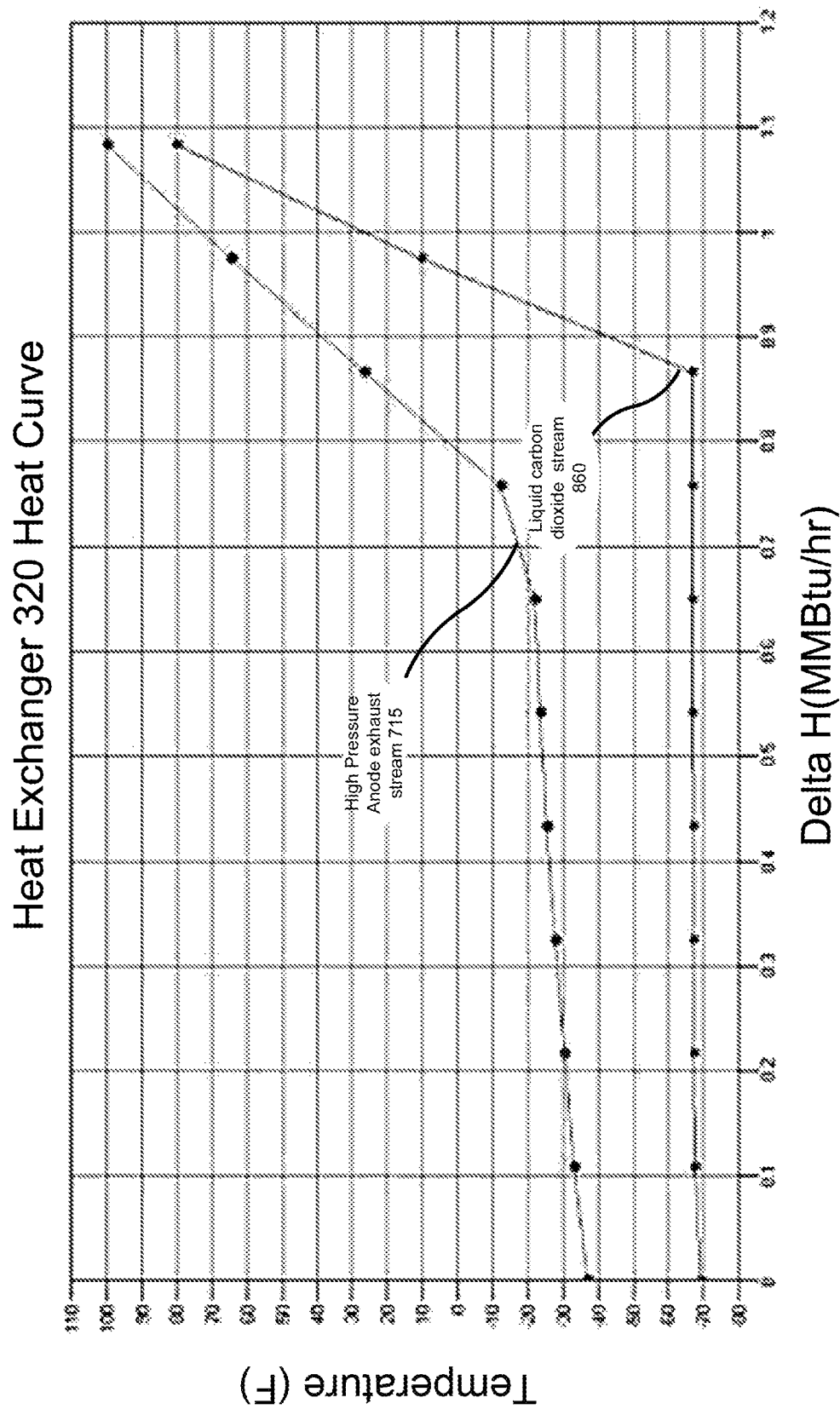
FIG. 4 is a plot showing heat curves of a heat exchanger included in the gas separation assembly of FIG. 3.

The first liquid $CO_2$ stream 850 and the second liquid $CO_2$ stream are combined to produce a total liquid $CO_2$ stream 857. The total liquid $CO_2$ may be collected or communicated to a flash cooler 324. The flash cooler 324 further reduces the pressure of the liquid $CO_2$ so that part of the $CO_2$ vaporizes and reduces the temperature of the liquid $CO_2$ stream, so as to produce a reduced temperature liquid $CO_2$ stream 860 which is communicated to the heat exchanger 320. The liquid $CO_2$ may serve as the coolant in the heat exchanger 320 for cooling the high pressure anode exhaust gas received from the compression loop 300a. The liquid $CO_2$ may be vaporized in the heat exchanger 320 to produce a vaporized $CO_2$ stream 865 which may be extracted from the chilling loop 300b and collected. FIG. 4 is a plot showing the heat curves for the high pressure anode exhaust gas stream 715 and liquid carbon dioxide stream 860, showing the change in enthalpy and temperature for each stream.

If liquid $CO_2$ is the desired method of recovery, the liquid $CO_2$ stream 857 may be pumped to a higher pressure and exported. In this embodiment, chiller 320 and the separation device (knock out pot) 322 are eliminated and the duty of the refrigeration chiller 326 is increased.

Tables II summarizes the parameters of various streams of a non-methanated anode exhaust gas, and Table III summarizes the parameters various streams of liquid $CO_2$ and water streams separated from the non-methanated anode exhaust gas flowing through the gas separation assembly 300. The performance of the methanated anode exhaust gas is similar except that a reduced volume flow from the methanator reduces the compression power required, and a lower amount of the non-condensable anode exhaust gas stream is generated, increasing the amount of $CO_2$ captured. Table IV compares the parameters of anode exhaust gas stream 535, the non-condensable anode exhaust gas stream 815 and the exported $CO_2$ stream 865 for the gas separation assembly 300 operating on non-methanated anode exhaust gas (base case) and methanated anode exhaust gas (methanated case). It can be seen that the non-methanated anode exhaust gas includes about 66 mole % carbon dioxide, while the methanated anode exhaust gas includes about 77 mole % carbon dioxide. Moreover, the volume flow of the non-methanated anode exhaust gas is about 322 lb-mole/hr and the volume flow rate of the methanated anode exhaust gas is 260.05 lb-mole/hr. Therefore, lower compressive power is required to compress the methanated anode exhaust gas which results lower power consumption and lower costs. The non-condensable anode exhaust gas stream is reduced from 153.49 lb-mole/hr for the non-methanated case to 48.24 lb-mole/hr for the methanated case, reducing the $CO_2$ in the residual fuel and increasing the CO2 exported.

TABLE II

Parameters of various streams of a non-methanated anode exhaust gas flowing through the gas separation assembly 300.

| | Stream No. | | | | | |
|---|---|---|---|---|---|---|
| | 535 | 39 | 715 | 800 | 860 | 865 |
| | Name | | | | | |
| | AO Blwr Out from Methanator | Compression Condensate 0.88 gpm | HP AE to Cooling | AE from Stage 1 Cooling to KP Pot #2 | Flashed AE Liquid (CO2) to Hx #132 | Vaporized AE Liquid (CO2) from Hx #132 |
| Molar flow lbmol/hr | 260.05 | 24.21 | 235.85 | 235.85 | 187.60 | 187.60 |
| Mass flow lb/hr | 9,691.9 | 436.4 | 9,255.5 | 9,255.5 | 8,095.4 | 8,095.4 |
| Temp F. | 148° | 100° | 100° | −42° | −75° | 80° |
| Pres psia | 16.50 | 16.50 | 314.50 | 314.50 | 80.00 | 80.00 |

| Components | lb-mole/hr | mole % | lb-mole/hr | mole % | lb-mole/hr | mole % | lb-mole/hr | mole % | lb-mole/hr | mole % | lb-mole/hr | mole % |
|---|---|---|---|---|---|---|---|---|---|---|---|---|
| Hydrogen | 14.36 | 5.52 | 0.00 | 0.00 | 14.36 | 6.09 | 14.36 | 6.09 | 0.46 | 0.24 | 0.46 | 0.24 |
| Methane | 17.14 | 6.59 | 0.00 | 0.00 | 17.14 | 7.27 | 17.14 | 7.27 | 4.28 | 2.28 | 4.28 | 2.28 |
| Carbon Monoxide | 0.76 | 0.29 | 0.00 | 0.00 | 0.76 | 0.32 | 0.76 | 0.32 | 0.10 | 0.06 | 0.10 | 0.06 |
| Carbon Dioxide | 202.21 | 77.76 | 0.01 | 0.03 | 202.20 | 85.74 | 202.20 | 85.74 | 181.95 | 96.98 | 181.95 | 96.98 |
| Water | 24.94 | 9.59 | 24.20 | 99.96 | 0.74 | 0.31 | 0.74 | 0.31 | 0.74 | 0.39 | 0.74 | 0.39 |
| Nitrogen | 0.65 | 0.25 | 0.00 | 0.00 | 0.65 | 0.27 | 0.65 | 0.27 | 0.07 | 0.04 | 0.07 | 0.04 |
| Oxygen | 0.00 | 0.00 | 0.00 | 0.00 | 0.00 | 0.00 | 0.00 | 0.00 | 0.00 | 0.00 | 0.00 | 0.00 |
| Total | 260.05 | 100.00 | 24.21 | 100.00 | 235.84 | 100.00 | 235.84 | 100.00 | 187.60 | 100.00 | 187.60 | 100.00 |

Comp kw 200 LP 190 HP 390 Tot KW

TABLE III

Parameters of various carbon dioxide and water streams separated from a non-methanated anode exhaust gas in the gas separation assembly 300.

| | Stream No. | | | | | |
|---|---|---|---|---|---|---|
| | 805 | 510 | 815 | 850 | 855 | 857 |
| | Name | | | | | |
| | AE vapor from KO Pot #2 | AE from Refrig Cooling to KO Pot #4 | Non-Condesible Gas (Recycle to Fuel Cell) | AE Liquid (CO2) from KO Pot #2 | AE Liquid (CO2) from KO Pot #4 | Total AE Liquid (CO2) for export or to Hx #132 |
| Molar flow lbmol/hr | 55.76 | 55.76 | 48.24 | 180.09 | 7.51 | 187.60 |
| Mass flow lb/hr | 1,484.4 | 1,484.4 | 1,160.1 | 7,771.1 | 324.3 | 8,095.4 |
| Temp F. | −42° | −50° | −50° | −42° | −50° | −42° |

TABLE III-continued

Parameters of various carbon dioxide and water streams separated from
a non-methanated anode exhaust gas in the gas separation assembly 300.

| Pres psia | 314.50 | | 314.50 | | 314.50 | | 314.50 14.63 gpm | | 314.50 0.61 gpm | | 314.50 15.23 gpm | |
|---|---|---|---|---|---|---|---|---|---|---|---|---|
| Components | lb-mole/hr | mole % | lb-mole/hr | mole % | lb-mole/hr | mole % | lb-mole/hr | mole % | lb-mole/hr | mole % | lb-mole/hr | mole % |
| Hydrogen | 13.92 | 24.96 | 13.92 | 24.96 | 13.90 | 28.81 | 0.44 | 0.24 | 0.02 | 0.26 | 0.46 | 0.24 |
| Methane | 13.06 | 23.42 | 13.06 | 23.42 | 12.86 | 26.66 | 4.09 | 2.27 | 0.20 | 2.60 | 4.28 | 2.28 |
| Carbon Monoxide | 0.66 | 1.18 | 0.66 | 1.18 | 0.65 | 1.35 | 0.10 | 0.06 | 0.00 | 0.06 | 0.10 | 0.06 |
| Carbon Dioxide | 27.55 | 49.41 | 27.55 | 49.41 | 20.25 | 41.99 | 174.66 | 96.98 | 7.29 | 97.03 | 181.95 | 96.98 |
| Water | 0.00 | 0.00 | 0.00 | 0.00 | 0.00 | 0.00 | 0.74 | 0.41 | 0.00 | 0.01 | 0.74 | 0.39 |
| Nitrogen | 0.58 | 1.03 | 0.58 | 1.03 | 0.57 | 1.19 | 0.07 | 0.04 | 0.00 | 0.04 | 0.07 | 0.04 |
| Oxygen | 0.00 | 0.00 | 0.00 | 0.00 | 0.00 | 0.00 | 0.00 | 0.00 | 0.00 | 0.00 | 0.00 | 0.00 |
| Total | 55.76 | 100.00 | 55.76 | 100.00 | 48.24 | 100.00 | 180.09 | 100.00 | 7.51 | 100.00 | 187.60 | 100.00 |
| | CO2 Reduction | | 27.546 13.6% | | | | Hx132 Duty Refrig Hx4 Duty | 1.379 0.048 | | | Total Duty, mmbtu/hr | 1.427 |

TABLE IV

Comparison between parameters of anode exhaust gas stream 535, non-condensable anode exhaust gas 815 expelled from
the gas separation assembly 300 and collected carbon dioxide stream 865 for a base case and a methanation case.

| | Base-Case | | | Methanated-Case | | |
|---|---|---|---|---|---|---|
| Stream-No. | 535 | 815 | 865 | 535 | 815 | 865 |
| Name | AO Blwr Out | Recyle Gas | CO2 Export | AO Blwr Out | Recyle Gas | CO2 Export |
| Molar flow lbmol/hr | 322.96 | 153.47 | 145.70 | 260.05 | 48.24 | 187.60 |
| Mass flow lb/hr | 10,217.1 | 3,429.1 | 6,359.4 | 9,691.9 | 1,160.1 | 8,095.4 |
| Temp F. | 142° | −45° | 80° | 148° | −50° | 80° |
| Pres psia | 16.50 | 314.50 | 80.00 | 16.50 | 314.50 | 80.00 |
| Average mol wt | 31.64 | 22.34 | 43.65 | 37.27 | 24.05 | 43.15 |
| Actual dens lb/ft3 | 0.0810 | 1.6790 | 0.6199 | 0.0946 | 1.8939 | 0.6124 |
| Actual vol ft3/min | 2101.05 | 34.04 | 170.98 | 1707.76 | 10.21 | 220.30 |

| Components | lb-mole/hr | mole-% | lb-mole/hr | mole-% | lb-mole/hr | mole-% | lb-mole/hr | mole % | lb-mole/hr | mole % | lb-mole/hr | mole % |
|---|---|---|---|---|---|---|---|---|---|---|---|---|
| Hydrogen | 77.47 | 23.99 | 76.88 | 50.10 | 0.59 | 0.41 | 14.36 | 5.52 | 13.90 | 28.81 | 0.46 | 0.24 |
| Methane | 0.27 | 0.08 | 0.25 | 0.16 | 0.02 | 0.01 | 17.14 | 6.59 | 12.86 | 26.66 | 4.28 | 2.28 |
| Carbon Monoxide | 5.13 | 1.59 | 4.95 | 3.23 | 0.18 | 0.13 | 0.76 | 0.29 | 0.65 | 1.35 | 0.10 | 0.06 |
| Carbon Dioxide | 214.70 | 66.48 | 70.75 | 46.10 | 143.95 | 98.80 | 202.21 | 77.76 | 20.25 | 41.99 | 181.95 | 96.98 |
| Water | 24.73 | 7.66 | 0.00 | 0.00 | 0.94 | 0.64 | 24.94 | 9.59 | 0.00 | 0.00 | 0.74 | 0.39 |
| Nitrogen | 0.65 | 0.20 | 0.63 | 0.41 | 0.02 | 0.01 | 0.65 | 0.25 | 0.57 | 1.19 | 0.07 | 0.04 |
| Total | 322.96 | 100.00 | 153.46 | 100.00 | 145.70 | 100.00 | 260.05 | 100.00 | 48.24 | 100.00 | 187.60 | 100.00 |
| | CO2 Recovery Total Comp kw Hx320 Duty Refrig Hx326 Duty | | 67.0% 502 1.083 mmbtu/hr 0.175 mmbtu/hr | | | | CO2 Recovery Total Comp kw Hx320 Duty Refrig Hx326 Duty | | 90.0% 390 1.379 mmbtu/hr 0.048 mmbtu/hr | | | |

FIG. 5 is a schematic flow diagram of an example method 400 for concentrating and separating carbon dioxide from a flue gas, for example the flue gas produced by the power production system 100 or the power producing gas separation and sequestration system 200.

The method 400 comprises supplying and processing flue gas from a power generation system at 402, for example a fossil fuel device, facility or installation (e.g., a power plant, boiler or any other combustor such as kilns in a cement factory or coke ovens in the steel industry). The flue gas may include carbon dioxide, water, oxygen, nitrogen and other inert gases. The flue gas may be processed to remove sulfur oxides and other trace species, for example via the trace contaminant/pollutant gas removal device 215

The flue gas is heated at 402, for example using waste heat from a fuel cell cathode exhaust and/or by oxidizing fuel in the oxidizer, as described herein with respect to the power producing gas separation and sequestration system 200. The preheated flue gas is communicated to a cathode section of a fuel cell at 406. For example, the preheated flue gas is communicated to the cathode section 4/12/236 of the fuel cell 1/10/235 of FIGS. 1A, 1B, and 2, respectively. The cathode section 4/14/236 may cause the flue gas to undergo an electrochemical reaction with hydrogen fuel to produce and output power and transfer carbon dioxide to the anode.

An anode exhaust gas is processed to convert hydrogen included in the anode exhaust gas to methane at 408. For example, the anode exhaust gas including spent fuel, hydrogen, carbon dioxide, water and carbon monoxide is output from the anode section 3/14/237 of the fuel cell 1/10/235 and processed to convert at least a portion of the hydrogen included in the anode exhaust gas to methane so as to produce a methanated anode exhaust gas. As described herein, the methanated anode exhaust gas may include a higher concentration of carbon dioxide relative to the non-methanated anode exhaust gas.

The methanated anode exhaust gas is communicated to a gas separation assembly at 410. For example, the methanated anode exhaust gas is provided to the gas separation assembly 25/300 for separating carbon dioxide and optionally, water from the methanated anode exhaust gas, as described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A power production system comprising:
    a flue gas generator configured to generate a flue gas that includes carbon dioxide and oxygen;
    a fuel supply;
    a fuel cell assembly that includes:
        a cathode section configured to receive the flue gas generated by the flue gas generator, and to output cathode exhaust, and
        an anode section configured to receive fuel from the fuel supply, and to output anode exhaust that contains between 20 mol % and 25 mol % hydrogen and between 65 mol % and 75 mol % carbon dioxide;
    a methanator configured to receive the anode exhaust, convert at least a portion of the hydrogen in the anode exhaust to methane, and output methanated anode exhaust containing between 5 mol % and 10 mol % hydrogen and between 75 mol % and 85 mol % carbon dioxide;
    a chiller assembly configured to cool the methanated anode exhaust to a predetermined temperature so as to liquefy carbon dioxide in the methanated anode exhaust; and
    a gas separation assembly configured to receive the cooled methanated anode exhaust and separate the liquefied carbon dioxide from residual fuel gas.

2. The power production system of claim 1, wherein the flue gas generated by the flue gas generator includes 3-15% carbon dioxide, 1-20% water, and 3-15% oxygen, with a balance being nitrogen.

3. The power production system of claim 1, further comprising a supplementary air source configured to provide supplementary air to the flue gas before the flue gas is received at the cathode section of the fuel cell assembly.

4. The power production system of claim 1, further comprising a heat recovery assembly configured to receive the cathode exhaust, recover waste heat from the cathode exhaust, and provide the waste heat to drive the chiller assembly.

5. The power production system of claim 1, wherein the cathode section of the fuel cell assembly is configured to receive exclusively all or part of the flue gas generated by the flue gas generator.

6. The power production system of claim 1, further comprising a water removal assembly configured to receive the methanated anode exhaust, and provide water-separated methanated anode exhaust to the chiller assembly.

7. The power production system of claim 1, further comprising a compressor configured to compress the methanated anode exhaust before the methanated anode exhaust is provided to the chiller assembly.

8. The power production system of claim 7, wherein the compressor is configured to compress the methanated anode exhaust to at least 200 psi.

9. The power production system of claim 1, wherein the chiller assembly is configured to cool the methanated anode exhaust to a temperature below −40° C.

10. The power production system of claim 1, further comprising:
    an oxidizer configured to:
        receive the flue gas from the flue gas generator,
        receive the residual fuel gas from the gas separation assembly,
        oxidize the residual fuel gas to heat the flue gas, and
        provide the heated flue gas to the cathode section of the fuel cell assembly.

11. The power production system of claim 10, further comprising a heat exchanger configured to heat the flue gas from the flue gas generator using waste heat in the cathode exhaust, and provide the heated flue gas to the oxidizer.

12. The power production system of claim 1, further comprising a heat exchanger configured to heat the flue gas from the flue gas generator using waste heat in the cathode exhaust, and provide the heated flue gas to the cathode section of the fuel cell assembly.

13. The power production system of claim 1, further comprising a heat exchanger configured to heat fuel gas from the fuel supply using waste heat in the cathode exhaust, and provide the heated fuel gas to the anode section of the fuel cell assembly.

14. The power production system of claim 1, where the anode section of the fuel cell assembly is configured to receive a part of the residual fuel gas from the gas separation assembly.

\* \* \* \* \*